United States Patent [19]
Quanbeck

[11] 4,296,695
[45] Oct. 27, 1981

[54] SEEDING DEVICE WITH AIR DISTRIBUTION SYSTEM

[75] Inventor: Sherman H. Quanbeck, Aneta, N. Dak.

[73] Assignee: Wil-Rich, Inc., Wahpeton, N. Dak.

[21] Appl. No.: 128,250

[22] Filed: Mar. 7, 1980

Related U.S. Application Data

[63] Continuation of Ser. No. 892,985, Apr. 3, 1978, abandoned.

[51] Int. Cl.³ .......................... A01C 7/20; A01C 7/06; A01C 15/04
[52] U.S. Cl. .................................. 111/34; 111/57; 111/73; 111/77; 111/85; 111/86; 239/654; 239/655; 406/123; 406/144
[58] Field of Search ................. 111/34, 85, 80, 70, 111/73, 77, 86; 193/9; 406/144, 128, 123, 194; 222/630, 414, 263, 488; 172/643, 707, 142, 706; 239/654, 655

[56] References Cited

U.S. PATENT DOCUMENTS

| | | | |
|---|---|---|---|
| 1,021,017 | 3/1912 | Thrush | 111/85 |
| 1,671,918 | 5/1928 | Zobelein | 406/144 X |
| 2,621,156 | 12/1952 | Farrell | 406/144 X |
| 2,919,159 | 12/1959 | LaCroix | 406/144 X |
| 3,490,654 | 1/1970 | Fischer | 222/193 |

FOREIGN PATENT DOCUMENTS

| | | | |
|---|---|---|---|
| 840146 | 4/1970 | Canada | 111/86 |
| 856528 | 11/1970 | Canada | 111/77 |
| 2521619 | 10/1976 | Fed. Rep. of Germany | 111/73 |
| 2233807 | 2/1975 | France | 406/123 |
| 2289103 | 7/1976 | France | 239/655 |
| 2338634 | 9/1977 | France | 111/77 |
| 6616291 | 5/1967 | Netherlands | 222/488 |
| 2040152 | 8/1980 | United Kingdom | 239/664 |

Primary Examiner—Steven A. Bratlie
Attorney, Agent, or Firm—Kinney, Lange, Braddock, Westman and Fairbairn

[57] ABSTRACT

A seeding device which comprises an attachment that can be placed onto existing tillage implements such as field cultivators and utilizes an air distribution system which permits the transfer of a metered amount of seed into individual air carrying lines, wherein each of said lines deposits seeds immediately behind each shovel or furrow opener on the tillage implement to provide an accurate, and large scale seeding device.

20 Claims, 12 Drawing Figures

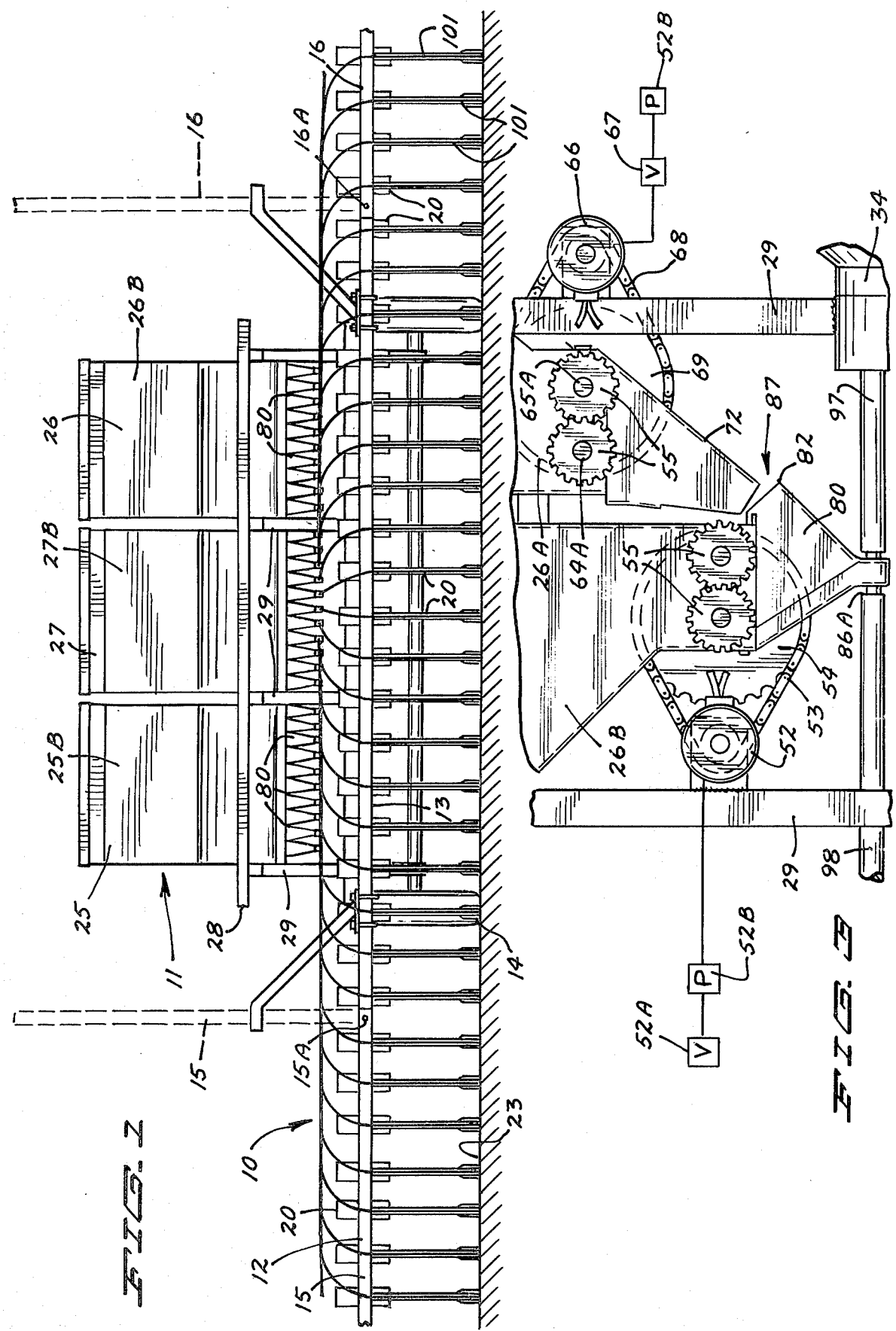

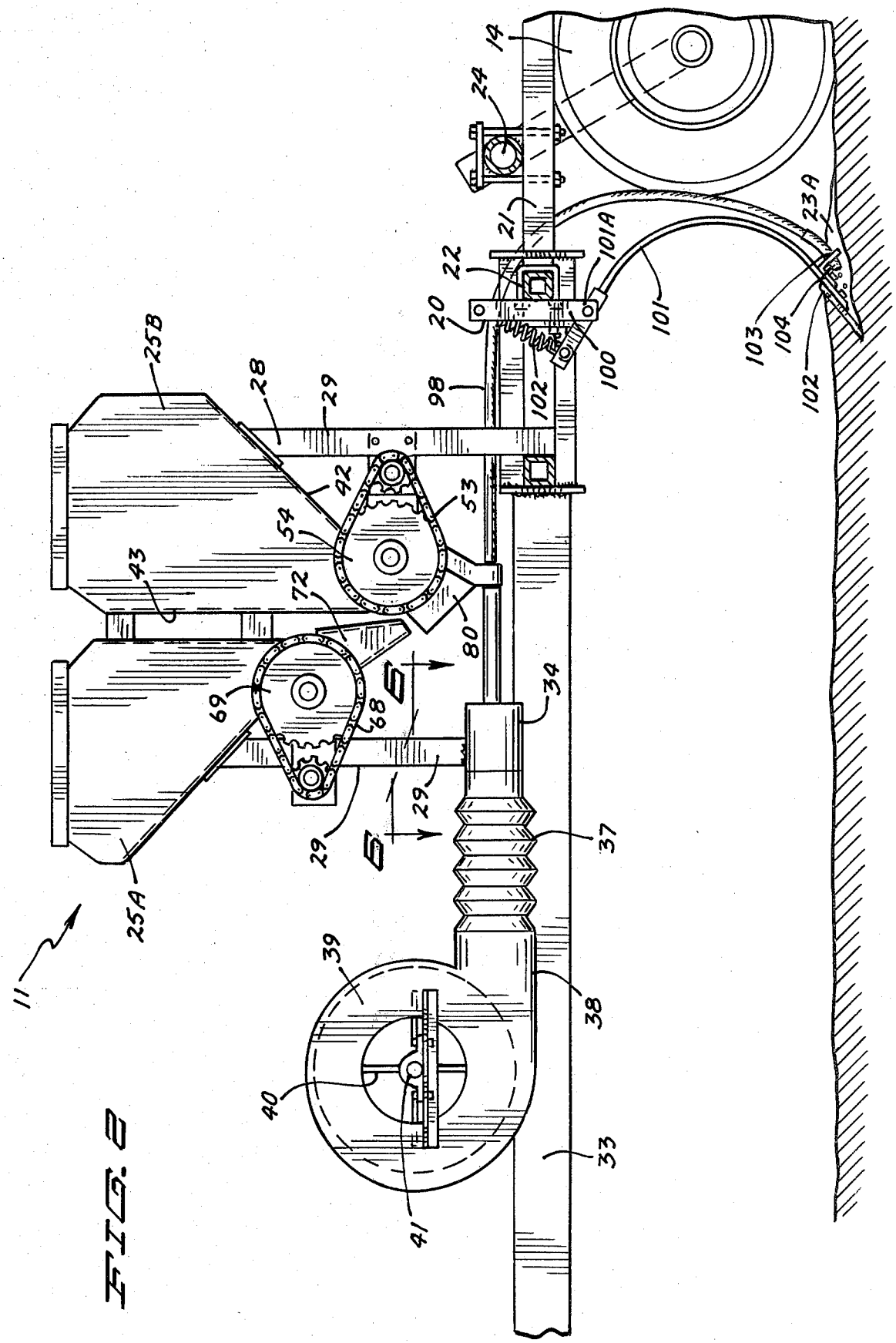

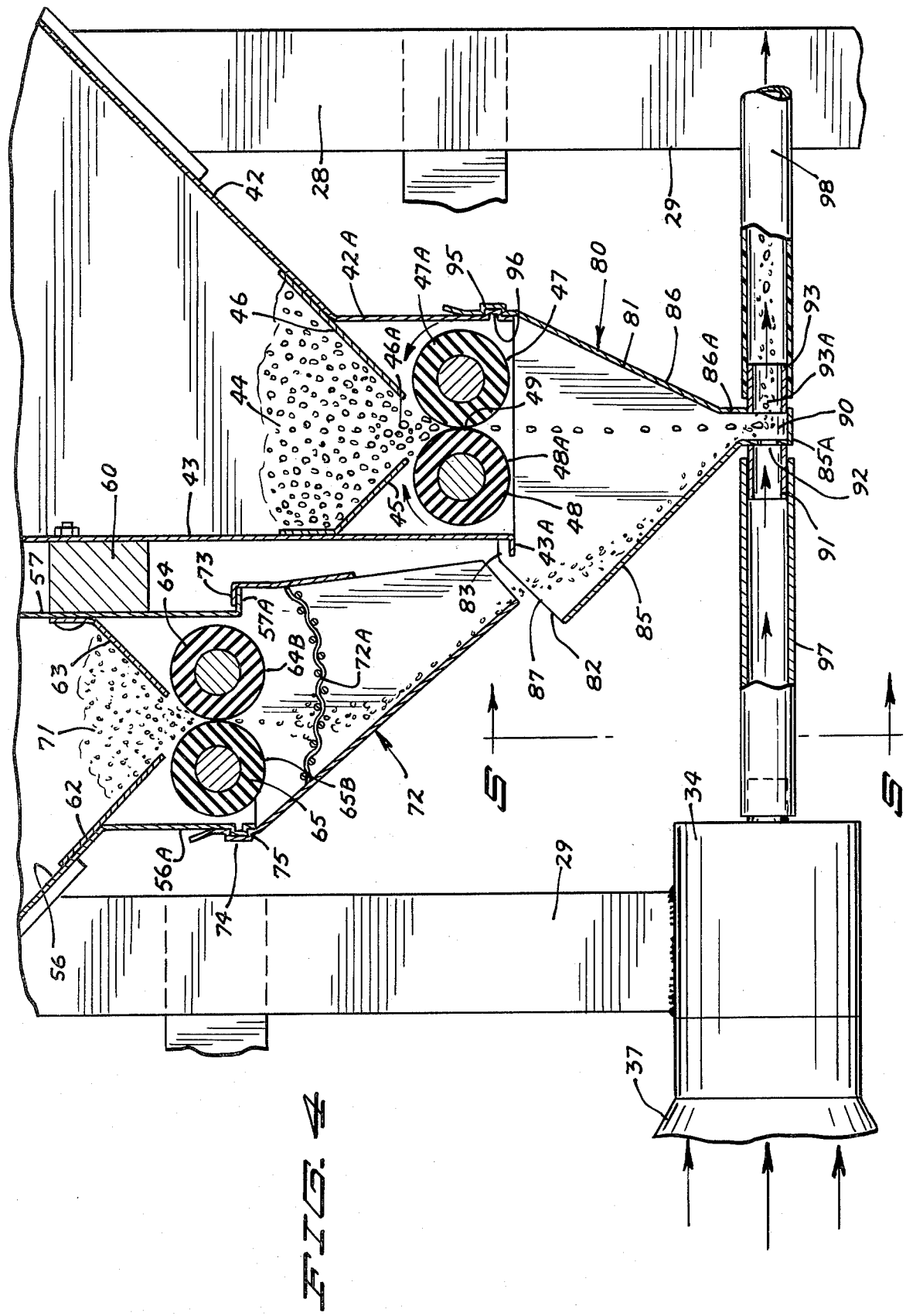

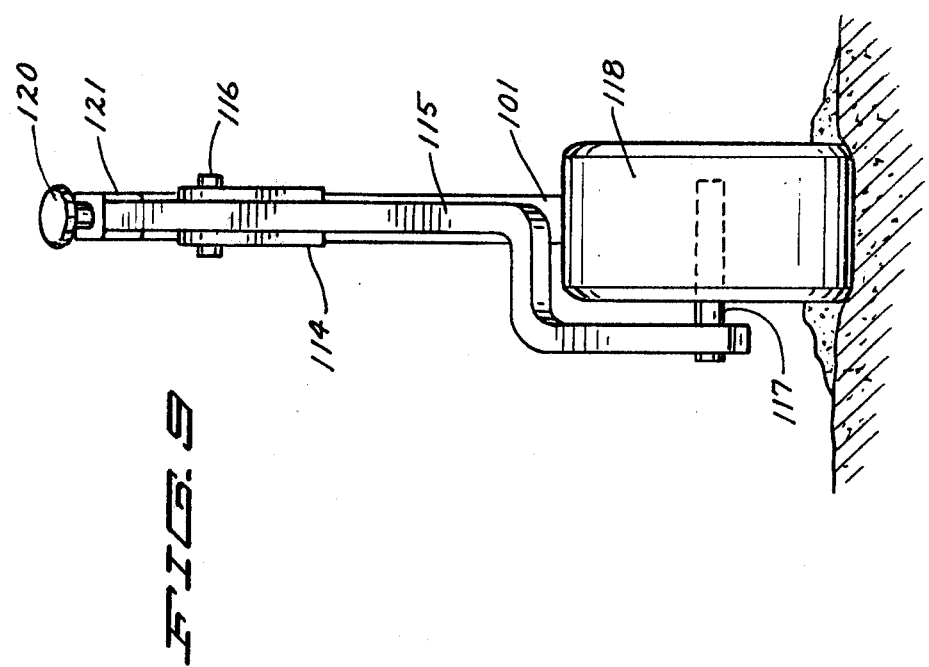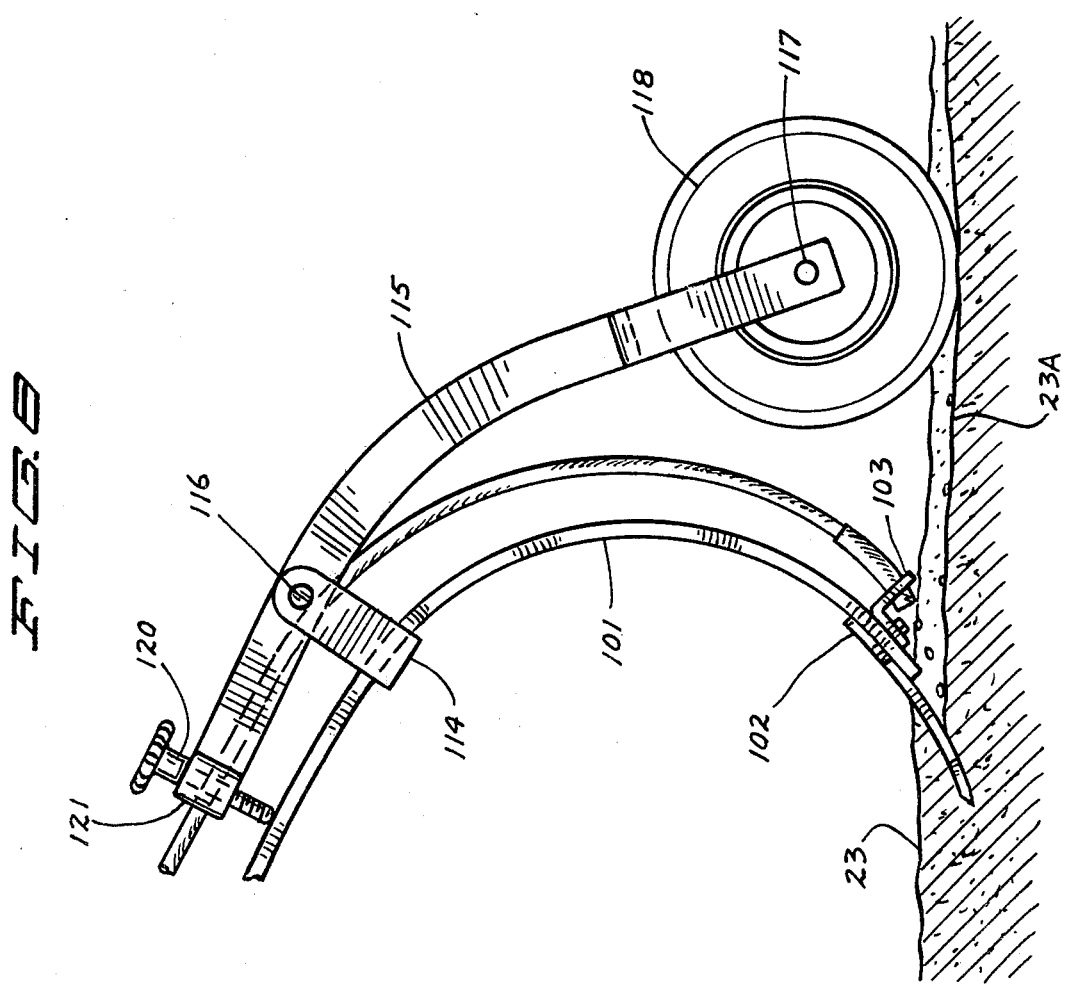

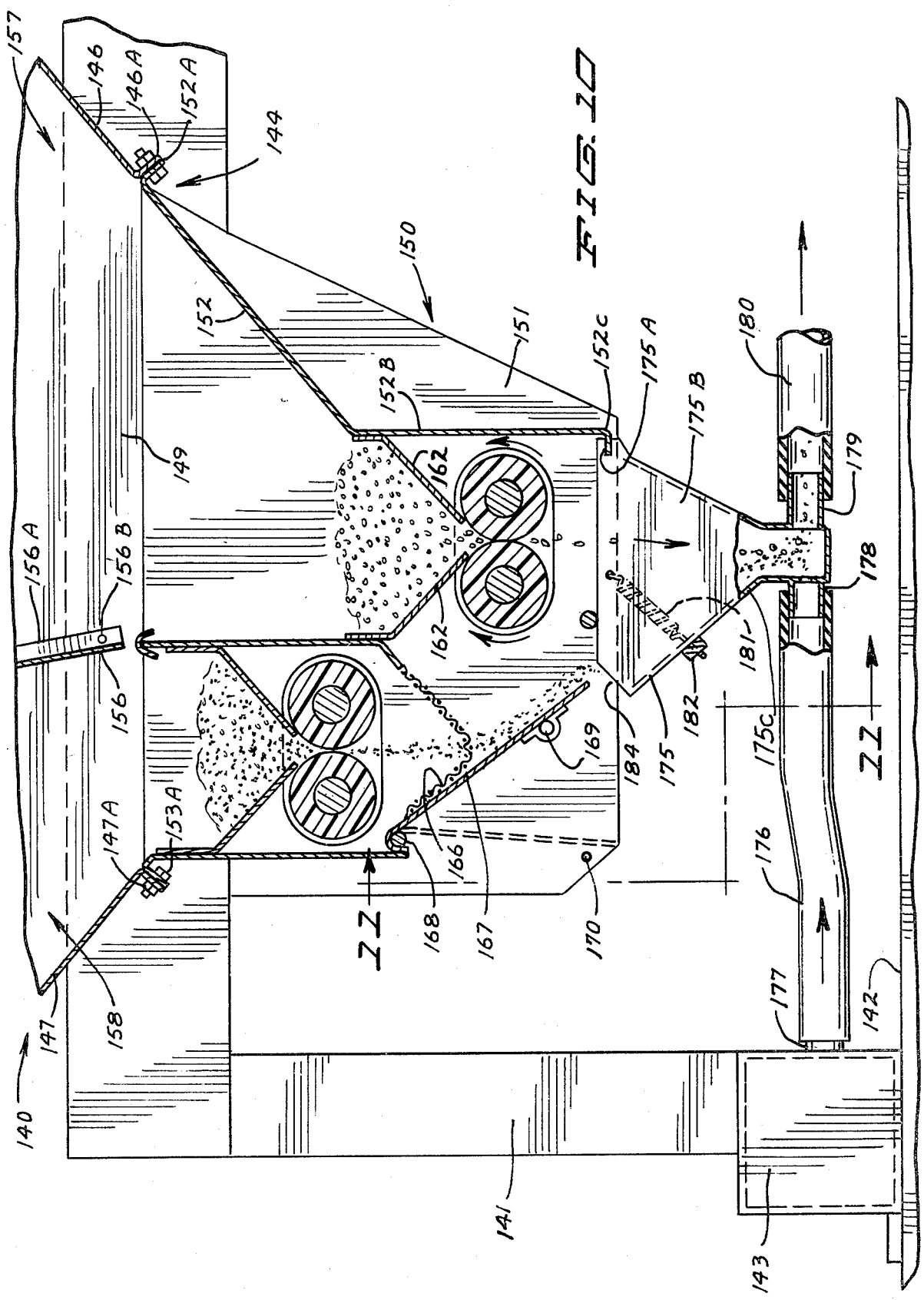

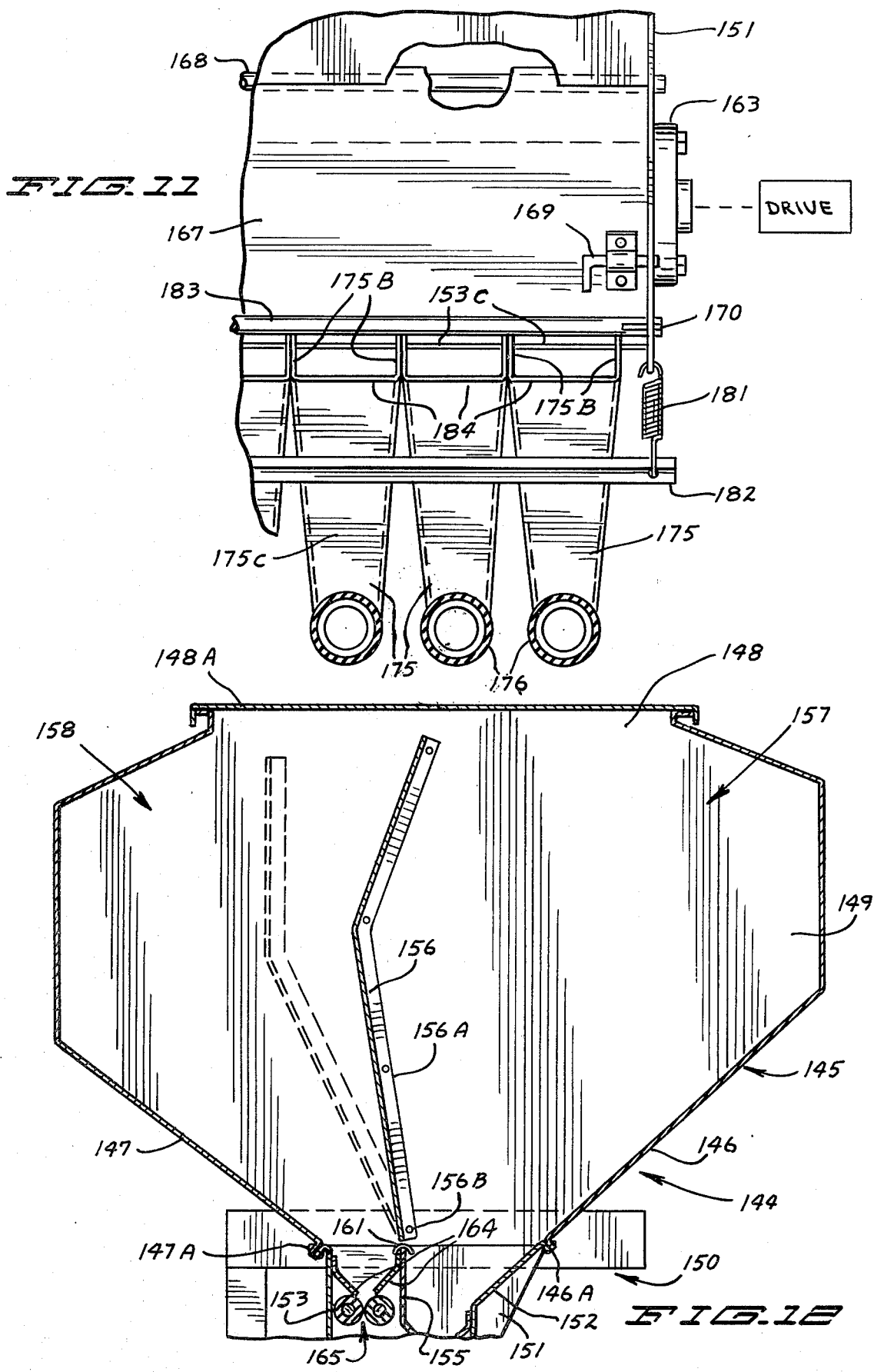

SEEDING DEVICE WITH AIR DISTRIBUTION SYSTEM

This is a continuation of application Ser. No. 892,985, filed Apr. 3, 1978 now abandoned.

BACKGROUND OF THE INVENTION

1. Field of the Invention

The present invention relates to seeding devices that can be attached to tillage implements and which utilize air conveying for distribution of the seed to furrow openers.

2. Prior Art

In the prior art various seeding devices which mount onto tillage implements have been advanced. For example, U.S. Pat. No. 2,199,755 issued May 7, 1940 to W. R. Pyron shows a seeder attachment for disc harrows, and U.S. Pat. No. 3,811,387 illustrates the use of seed tubes relative to shovel type furrow openers.

U.S. Pat. No. 2,812,732 shows a central hopper and a single impeller fan for distributing seed to individual seed tubes mounted behind each shovel on the cultivator.

Pneumatic seed conveying also has been known. There are a large number of corn planter type devices which lift individual seeds through a vacuum arrangement, and British Pat. No. 871,261 shows a type of pneumatic spreader for inorganic fertilizer. U.S. Pat. No. 3,631,825 shows an all pneumatic seed conveying and distributing system with central metering and division of the seeds into individual streams.

U.S. Pat. No. 383,224 shows a central hopper arrangement in a drill plow using gravity type feed without pneumatic conveying. Another type of seeding machine using an auger lateral conveyer is shown in U.S. Pat. No. 534,750.

In modern day farming tillage implements such as field cultivators are commonly 30 feet wide and more, and generally include a center main section and folding wings or outer sections that fold up for transport. It is desirable from a cost standpoint to adapt such devices (which may be substantially wider than 30 feet) for seeding. One of the problems in such adaptation is to get accurate metering and uniform distribution of the seed to each of the individual furrow openers or shovels that are mounted on the cultivator, and at the same time have the seeding units adaptable for easy mounting onto and removal from such implement to permit multiple use including its primary purpose of tilling or cultivating.

SUMMARY OF THE INVENTION

A pneumatic seeding device is disclosed which comprises at least one hopper mounted on a field cultivator and including means for metering seed into individual seed cups. As shown, the cups form the means for dividing the flow of seed from the metering device. A pneumatic conveying system is connected to each of the seed cups. The pneumatic conveying system provides a flow of low pressure air into a transfer chamber where the seed is entrained in an air stream. The seeds are conveyed through tubes to individual furrow openers.

The furrow openers are the shovels (chisel points) of the conventional field cultivator assembly, and because of the use of pneumatic conveying the width of the unit is not limited to width which can be fed through gravity.

Additionally, inorganic fertilizer from separate hoppers can be metered into the same cups as the seed and conveyed in the same fluid stream as the seed to each of the individual furrow openers.

In the form shown, the seed cups are mounted below metering rollers and made so that they can be easily mounted onto the seed hoppers, and detached therefrom for cleaning. The seed cups are open at the top so that if plugging occurs there is a visual indication of spilling seed at the top of the cup. The fluid-seed transfer chamber that is in the seed cups through which air flows is designed specifically to create reliable transfer of the seed and inorganic fertilizer pellets into the individual hoses leading to each of the respective furrow openers. Swirling and turbulence is minimized in that swirling and turbulence tend to cause the seed to be suspended within the seed cups and to plug the cup.

Additionally, the seed cups divide the flow of inorganic fertilizer which is also provided from metering rolls. The fertilizer drops into the open top portion of the seed cups for transfer to the furrow openers.

Fluid under pressure is provided through a simple paddle type centrifugal fan that can be operated from the power take-off of the tractor which tows the seeder. A frame member of the seeder attachment itself is utilized as a plenum chamber to distribute the fluid under low pressure into individual hoses or passageways leading to each of the seed cups, for providing the air at sufficient volume and at low pressure to prevent irregularities in the flow of air.

The metering devices for the seed hopper and the fertilizer hoppers are pairs of rollers which extend along each hopper section and are power driven and can be varied in speed to meter properly.

As shown the metering devices are operated through a variable speed hydraulic motor which can also be powered from the tractor towing the seeding device. The metering rollers can be provided with ground drive which would vary the feeding rate in accordance with the speed of movement over the ground of the seeding device. The rollers are made of elastomeric material (relatively soft) which does not crack or crush the seeds. The rollers are in contact or closely adjacent and the seeds are metered by compressing the rollers slightly as the seeds move through the rollers. The soft rollers are close enough to each other to prevent seeds from shaking through when the unit is not being used. The surfaces of the rollers provide enough friction to feed the seed through in a positive manner and at a proper rate.

The device provides for even feeding to each of the furrow openers even for extremely wide units. The hoppers are centrally mounted and the conveying tubes or hoses are extended laterally.

One advantage of using a field cultivator is that the frame, which comprises a tool bar type frame, generally has substantial ground clearance and thus does not plug easily, and can go through areas where minimum tillage is desired.

The individual seed and fertilizer hoppers for each of the cultivator sections are mounted on the main or center section of the cultivator and plastic flexible hoses or tubes lead to each of the individual seed or furrow openers. The "wings" can thus be pivoted up for transport in the same manner as the field cultivator. Without the seeder attachment, the hoppers and tubes permit attachment or removal of the seeder with relative ease.

Additionally, if desired, gage wheels that can be adjusted for controlling the depth of the individual furrow openers and to provide a type of press wheel for covering action is also shown in the present application.

In a second form of the invention a single tank is used with an adjustable interior divider. The single tank eliminates possible problems with water dripping into the seed cups. Also, the second form includes means for easily cleaning the fertilizer screen as well as permitting the seed cups to be removed easily for cleaning.

BRIEF DESCRIPTION OF THE DRAWINGS

FIG. 1 is a schematic rear view of a field cultivator having a seeder attachment made according to the present invention installed thereon showing schematically the arrangement of the furrow openers and frame sections;

FIG. 2 is a part schematic side view of the seeder attachment of the present invention shown installed on a schematically shown field cultivator assembly, with a fan illustrated in position rotated 90° from its normal position for illustrative purposes;

FIG. 3 is a side view of the lower portions of the seeder attachment of FIG. 2 as viewed from an opposite side from FIG. 2;

FIG. 4 is an enlarged sectional view illustrating a typical metering device and seed cup used with the device of the present invention;

FIG. 8 is a side view of an optional gage and press wheel used with the furrow opener shank assemblies;

FIG. 9 is a rear view of the device of FIG. 8;

FIG. 10 is a seed and fertilizer tank made according to a second form of the invention showing the metering rollers for seed and fertilizer in relation to seed cups;

FIG. 11 is a fragmentary front elevational view of the device of FIG. 10 with parts broken away; and FIG. 12 is a side sectional view of the seed tank of FIG. 10 showing an adjustable partition utilized in the second form of the invention.

DESCRIPTION OF THE PREFERRED EMBODIMENTS

Figure 5:
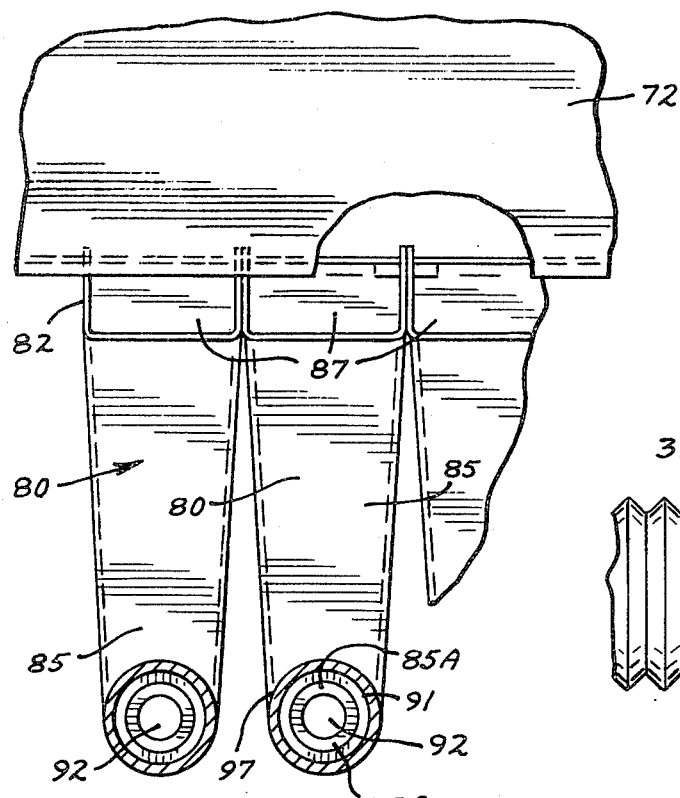
FIG. 5 is a view taken as on line 5—5 in FIG. 4.

Referring to FIG. 1, a typical field cultivator assembly illustrated generally at 10 is used for providing furrow openers for the seeding device attachment which is illustrated generally at 11. The field cultivator assembly as shown comprises a frame assembly 12, which is an assembly of three individual frame sections including a center main section 13 mounted on suitable depth controllable support wheels 14 in a normal manner of field cultivators of this type, and outer end or wing sections 15 and 16, at the opposite ends of the frame respectively.

Schematically shown is a pivot 15A for pivotally mounting the wing section 15 to the main section 13, and a second pivot 16A for mounting the wing section 16 to the main frame section 13. These pivots are shown only schematically because of the well known use of wing sections on field cultivators, and are shown to illustrate that in a normal manner the wing sections of the field cultivator assembly 10 can be folded upwardly as shown in dotted lines in FIG. 1 for road transport. The unit may be moved to transport position without making structural modifications to the seeder assembly, as will be explained.

The field cultivator frame is constructed in a normal manner comprising a plurality of horizontal frame members which mount individual field cultivator shank assemblies 20. These shank assemblies 20 can be of any desired type, for example the spring loaded assembly shown in my own U.S. Pat. No. 3,782,481. The frame sections 13, 15 and 16 include fore and aft extending frame members 21 as shown in FIG. 2, and cross tool bar frame members 22 on which shank assemblies 20 (which are furrow opener assemblies for seeding) are mounted.

The shank or furrow opener assemblies 20 are evenly spaced across the machine as shown. The individual spacing can be the desired spacing for seeding in existing conditions. The assemblies 20 have chisel point shovels which engage the ground which is indicated at 23. The support wheel assemblies 14 are mounted on a torque tube illustrated generally at 24 which can be used for raising and lowering the cultivator furrow opener assemblies 20 into and out of the ground 23. This also is done in a conventional manner through the use of hydraulic cylinders.

For example, a typical field cultivator that finds wide use is one that has been manufactured by Wil-Rich Corporation, Wahpeton, North Dakota, the assignee of this application and which is shown in its brochure entitled "Wil-Rich Field Cultivators" No. FS116.

The seeder attachment illustrated generally at 11 comprises three sets of tandem tanks. These sets of tanks are indicated generally at 25 for the wing section 15, 26 for the wing section 16, and 27 for the center section 13. These tanks are mounted onto a common frame 28 which has upright supports 29 that attach in a suitable manner to the cultivator frame members as shown schematically in FIG. 2.

Each of the tandem tank sections 25, 26 and 27 comprise a first front fertilizer tank 25A, 26A and 27A as shown typically in FIG. 2, the side view of the tank section 25 is illustrated. The seed tanks are shown at 25B, 26B and 27B. Each set of tandem tanks includes a seed tank and fertilizer tank.

The tanks have suitable hinged covers. The common frame 28 securely mounts the unit on the center frame section 13 of the field cultivator.

The field cultivator further includes a tubular frame assembly indicated at 33 at the forward end which is adapted to be attached to a suitable prime mover such as a tractor (not shown) which is used for pulling the unit over the ground and also for powering the various components.

It should be noted that the frame uprights 29 at the forward ends of the seeder attachment 11 are mounted onto a large square tube 34. The square tubular cross frame member 34 is sealed at its ends to form a hollow interior chamber 35 as perhaps best indicated in FIG. 6. The chamber 35 extends across the width of the seeder attachment and has an inlet opening 36 at the forward side thereof. A suitable conduit 37 is connected to this opening 36. The conduit 37 leads from the outlet 38 of a suitable relatively low pressure, high volume paddle fan 39. The paddle fan 39 shown in FIG. 2 is rotated 90° from its normal operation position. In other words, the paddle fan which includes a fan member 40 and a drive shaft 41 is normally positioned so that the axis of drive shaft 41 extends in fore and aft direction. The drive shaft 41 is powered by the power take-off of the prime mover utilized with the unit.

Each of the tank sections as shown has front and rear walls which taper together toward the lower portions of the respective tanks. For example shown in FIG. 4, each of the seed tanks 25A, 26A and 27A has a rear wall 42, and a generally vertical forward wall 43 defining the compartment in which seed indicated generally at 44 is contained. The wall 43 has a lip 43A which extends across each of the tank sections. In the interior of the tanks at lower portion of the wall 43 there is a diverter wall 45 and another diverter wall portion 46 is attached to the wall 42 and forms a continuation of the plane of the sloping wall portion 42. The lower end of wall 42 terminates in a generally vertical lower portion 42A, and this portion 42A is spaced from and cooperates with the lower portion of the wall 43 to define a chamber in which a pair of transversely extending soft rubber rollers indicated generally at 47 and 48 are mounted.

As shown, these rollers 47 and 48 have soft elastomeric outer portions 47A and 48A respectively and as will be explained they touch or are very closely spaced along their tangent lines indicated at 49. The rollers are powered and counter rotate in directions as indicated by the arrows in FIG. 4. The rollers 47 and 48 have center shafts. The shaft for roller 47 is driven with a hydraulic motor indicated at 52 in FIG. 3.

The motor 52 is controlled through a suitable valve 52A controlling fluid under pressure from a pump 52B which in turn is powered from the prime mover or tractor.

Motor 52 drives a sprocket and chain indicated generally at 53 which drives a large sprocket 54 that is mounted directly to the shaft of the roller 47. At the opposite end of the tank assembly from sprocket 54 a pair of gears 55 are utilized for driving from roller 47 to the other roller 48 to rotate the rollers in counterrotating directions.

The valve 52A may be a variable output, or a separate variable valve can be utilized to control the speed of the motor 52 in a known manner and thus control the speed of rotation of the rollers 47 and 48, which in turn will control the rate of dispensing of the speed 44 through the rollers.

It should be noted that the individual rollers 47 and 48 for each of the seed tanks are independently mounted in each of the tanks and have shafts which extend outwardly from the tank. Between each of the tank sections a suitable flexible coupling or engagable drive member can be mounted on the shafts for the aligning rollers. Couplings would be used between the rollers in tanks 25 and 27 for example and between tanks 27 and 26 as well so that a drive hydraulic motor at one end of the tank will drive all dispensing rollers 47 and 48 through gears 55. Separate rollers are mounted in each of the seed dispensing tanks. As the rollers rotate seeds are expelled from between the rollers and are metered by the relative speed of rotation of the rollers.

Also as shown in FIG. 2, each of the fertilizer tanks is made up of front and rear walls, as well as end walls, as is the case with the seed tanks. As shown the forward wall 56 of the fertilizer tank is inclined and has a lower portion 56A that extends vertically. The rear wall 57 is a vertical wall, and it can also be seen in FIG. 2 that spacer blocks 60 may be utilized between the seed and fertilizer tanks of each of the tank sections 25, 26 and 27 to hold them as an assembly. The frame members previously described also hold the tanks in an assembly.

The fertilizer tank on each of the tank sets 25, 26 and 27 is identically constructed, and the interior of the front wall 56 of each of these tanks has an extension guide plate 62 and the rear wall 57 has a guide plate 63 attached thereto as well. These plates define an opening between their lower ends, and it can be seen that the wall portion 56A and the lower portion of the rear wall 57 form a chamber in which a pair of fertilizer metering rollers 64 65 are mounted. These rollers are rotatably mounted on the end walls of each of the tanks in a suitable manner and are driven through the use of a hydraulic motor 66 (see FIG. 3) operating through a valve 67 from the pump 52B. The motor 67 is variable in speed through the use of the valve 67, and drives a sprocket which drives a chain 68 which in turn drives a sprocket 69 that rotates the center shaft for roller 65.

A set of gears 55 is also utilized on the shafts 65A and 64A of the rollers so that both rollers are driven through the gears at the opposite end of the tank assembly from the hydraulic motor. The shafts are coupled with suitable couplings between tank sections.

The fertilizer dispensing rollers include soft covering 64B and 65B of elastomeric material and are substantially identical in construction to the seed metering rollers 47 and 48. The rollers rotate as shown by the arrows or the rollers and dispense pellets of fertilizer indicated at 71. The pellets pass through an opening defined by the guide members 62 and 63 which are tapered a desired amount onto the rollers and then are dispersed into a guide trough 72 which extends across the lateral width of each tank section. Thus a continuous guide trough is used. A screen 72A is used to prevent large lumps of fertilizer from dropping through the chute. The fertilizer from the trough 72 will drop into individual cups, which will be explained later.

The guide troughs 72 are held on each respective tank section with a desired number of suitable small clips 73 that each fit over a lip 57A at the lower end of the wall 57. A spring clip 74 on the troughs is shaped to fit over a rib 75 that extends longitudinally along the lower portion 56A of the front wall of the fertilizer tanks so that the troughs 72 can be removably clipped in place on their respective tanks.

The rollers 64 and 65 (and rollers 47 and 48) are self-contained within each of the tanks and mounted in bearings on the end walls of the respective tanks 25A, 26A, and 27A (or 25B, 26B and 27B for seed metering rollers). As stated, between the tanks 25 and 27 and 26 and 27 suitable interlocking coupling members between the respective roller shafts are utilized. These couplings can be flexible couplers, or jaw type couplers that are used in a known manner so that the hydraulic motors on one end of the tank assembly will drive all of the rollers in all of the respective seed and fertilizer tanks through the gear sets 55 at the opposite end. Both rollers in each of the tanks are power drive.

The rollers 64 and 65 are used for metering fertilizer through the rollers at a desired rate depending on the speed of rotation of the hydraulic motor 66 which can be adjustable in a known manner through a suitable valve 67 or by other flow control means (these rollers could be connected to a ground drive as well) and the metered fertilizer is fed out along the entire length of the rollers. The rollers are continuous inside each of the tanks and the trough 72 is also continuous across the width of each fertilizer tank and are immediately below the rollers.

Likewise, the rollers 47 and 48 act as metering rollers for seed 44 coming through the opening between the guide plates 45 and 46. The opening between these plates is indicated at 46A, is continuous across the width of the respective seed tank 25B, 26B and 27B, and the seed then is discharged in a line continuously across these rollers. The seed is divided into individual portions for each furrow opener by having a plurality of side by side seed cups indicated generally at 80 positioned below the rollers. Each of the seed cups 80 includes a chamber in which seed and fertilizer are combined with an air stream for distribution to the individual furrow openers.

Figure 7:
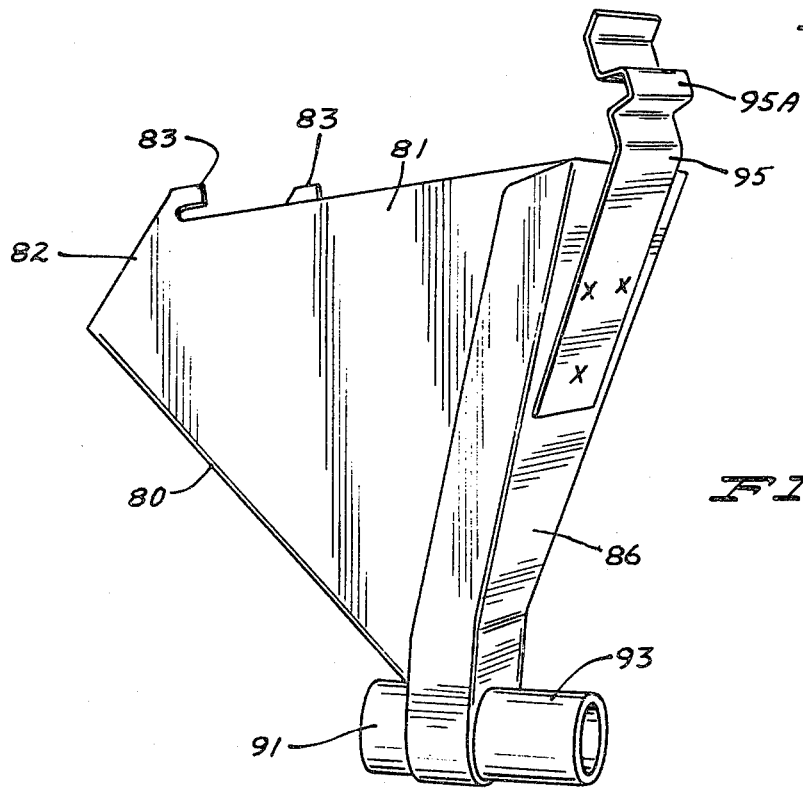
FIG. 7 is a perspective view of typical seed cup used in a pneumatic seeding device of the present invention.

The seed cups are shown in detail FIGS. 4, 5 and 7, perhaps best. It can be seen that the seed cups 80 include side walls 81 which are spaced laterally apart, and which are cut at an angle adjacent the forward ends along edges indicated at 82, and each of the walls 81 has an ear 83 positioned adjacent the forward end, and along the top edge of the walls. The side walls of the seed cups are joined together by a first forward wall 85 and a rear wall 86, which is also tapered.

The trimmed edges 82 and the upper edge of wall 85 define an opening indicated at 87 that is positioned ahead of the wall 43, and it can be seen that when the cups are in position on the respective grain tanks, the ears 83 are mounted on the flange 43A and are supported relative to the wall 43. The opening 87 is below the outlet opening from the fertilizer trough 72.

The side walls 81 of adjacent seed cups are positioned contiguous to each other at the upper ends where the ears 83 are found. The walls 81 of each cup then taper together and downwardly as shown in FIG. 5. The forward wall 85 has a substantially vertical lower portion 85A in which an orifice indicated at 92 is defined. The rear wall 86 of each cup also has a substantially vertical lower portion 86A which is prallel to and spaced rearwardly from the lower wall portion 85A. The lower ends of the side wall portions 81 join the part circular lower ends of wall portions 85A and 86A to form a part cylindrical chamber 90, into which seed and fertilizer will drop as indicated in FIG. 4 after it has been metered through the respective rollers.

A tubular neck portion 91 is fixed to the outer side of the lower wall portion 85A and is concentric with the orifice 92. The orifice 92 is of smaller diameter than the interior diameter of the tubular neck 91. An outlet neck 93 is fixed to the exterior of portion 86A. It can be seen that an outlet opening 93A through the wall portion 86A leading to the tube 93 is substantially the same diameter as the interior of the tube. Opening 93A is larger in diameter than the inlet orifice 92. The lower wall of the chamber 90 is part cylindrical as previously explained but is slightly larger in diameter than the interior of the tube 93. As shown, it is approximately the same as the outside diameter of the tube 93. The axis of orifice 92 and the axis of opening 93A coincide.

The ears 83, 83 fit over the lip 43A (the lip or flange 43A fits into the slot below the ears) and a spring clip 95 is attached to the rear wall 86 and extends upwardly. The clip 95 has a receptacle portion 95A that fits over a rib 96 formed in the rear wall portion 42A, the rib 96 extends longitudinally along wall portion 42A so that the clips 95 of each seed cup may be positioned any place along the wall. The seed cups therefore can be placed very close together and no seed will drop between the adjacent walls 81 of two side by side seed cups.

Figure 6:
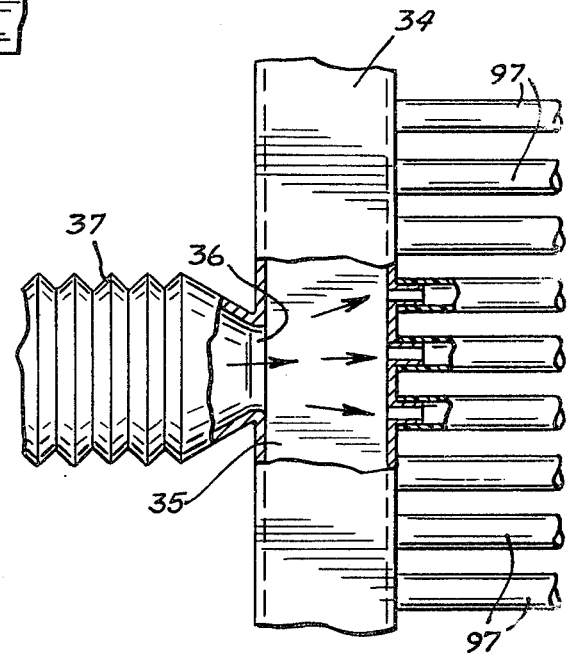
FIG. 6 is a schematic top plan view of a frame member showing plenum chamber action for the fan.

The plenum chamber 35 as shown in FIG. 6 has a plurality of individual sections of hose or plastic tubing 97 connected thereto and fitting over suitable outlet tubes that are welded to openings in the tube 34. The plastic tubes 97 in turn are connected individually to the tubes 91 of each of the seed cups. The outlet tube 93 from the seed cup is connected to a semi-rigid plastic hose or tube 98, and each of the tubes 98 in turn then leads to one of the individual furrow opener assemblies 20. Thus, there is one seed cup for each of the furrow openers, one of the tubes 97 for each of the furrow openers, and one of the tubes 98 for each of the furrow openers 20. There is also one of the chutes 72 for each of the tank sections.

Typically the tube 98 will lead to a furrow opener such as that shown in FIG. 2. The furrow opener in this case again is a spring loaded shank having a mounting bracket 100, and a spring shank and shank holder 101 are pivotally mounted thereto as at 101A and held in working position with a suitable tension spring 102. Such shanks are described, as previously stated in my U.S. Pat. No. 3,782,481. At the lower end of each of the spring shanks 101 there is a shovel member 102 bolted to the shank in the usual manner (see also FIG. 8). Chisel point or sweep shovels may be used for the types of furrow openers used in seeding. Usually there are two bolts which attach the shovels to the shank. In the upper one of the bolts an angle iron clip 103 is bolted in place, and this clip carries a metal tube portion 104 extending through and fixed to the clip. The plastic tube portion 98 then is pushed into the metal tube 104 and the air and seed which is being ejected in a manner that will be explained is sent out through the lower end of the tube 104. The tube 104 is bent in its midportion so that the axis of the tube inclines toward the back side of the lower end of shovel 102.

The shovel or chisel point 102 goes below the surface of the ground 23 creating a furrow indicated at 23A in FIG. 8, and the seed is shot right down into the bottom of the furrow immediately behind the shovel 102. because of the bent tube 104 that directs the seed down into this area. Dirt will fall in and cover the seed sufficiently so that it can germinate. If desired, a gauge-press wheel may be used to pack dirt over the seed, or a spring tooth harrow or other covering device could be pulled behind the field cultivator unit that is used for seeding.

Referring again to the showing of the seed cups in FIG. 4 and specifically chamber 90, the air flow is indicated in the arrows through the tube 97 and this air is normally about 1-2 psi, with an adequate volume to maintain this pressure throughout the length of the tubes down to the individual shovels.

The orifice 92 forms an opening approximately 11/32 inches in diameter. The air enters chamber 90 through the orifice 92. The space between the inner surfaces of the walls 85A and 86A which define the front and rear surfaces of the chamber 90 forms a throat portion and is approximately 9/16 inch, and should not exceed ⅝ inch in order to avoid excessive turbulence. Yet, the spacing of the surfaces carrying orifice 92 and the outlet opening 93A has to be large enough for the seed and fertilizer to fall between the surfaces without any substantial tendency to plug as it passes into the throat of the chamber. The airstream coming through the orifice 92 expands slightly without substantial turbulence and because of the relatively short distance between the orifice 92 and the larger outlet opening 93A there is little tendency for the air to start to swirl or become turbulent.

The airstream more or less expands slightly to the size of, or slightly smaller diameter than the outlet opening 93A, as it passes through the throat of chamber 90. At the same time the airstream creates a vacuum (aspiration action) near the upper portions of the chamber 90 tending to urge the seed and fertilizer to be carried into the fluid stream and out through the opening 93A. Gravity also urges the fertilizer and seed downwardly into the throat. The use of a larger outlet opening which permits the fluid stream to expand without turbulence tends to prevent swirling which would provide pockets of dead air in which seed and fertilizer could be immobilized and accumulate causing plugging of the seed cups.

It should be noted that the angle of wall 85 on which the fertilizer drops is selected to cause the fertilizer sliding off the wall to project toward the opening 93A. A continuation of the plane of wall 85 intersects the plane of opening 93A. The natural trajectory of fertilizer coming down the interior of the wall 85 is directly into the opening 93A. The airstream passing through the orifice 92 adds an impetus to this natural movement to pick up the fertilizer pellets.

The seed which is of lower specific gravity drops straight down, and as the seed enters the airstream it is carried in suspension into the opening 93A and thus into the connected tube 98 and to the respective furrow opener.

A suitable screen indicated at 72A is utilized inside the fertilizer trough 72 to prevent large clumps of fertilizer from dropping down into the seed cups 80 and causing plugging problems in the chamber 90. The fertilizer used presently is pelleted but occasionally the pellets will clump together. The rubber rollers usually break up the clumps. The screen 72A will suspend clumps which get through the rollers.

It should be noted that very large chunks cannot pass through the rollers in any event, so the screen 72A serves as a filter to make sure that larger chunks are not dropped through. The screen may be emptied periodically.

Because the airflow and pressure through the chamber 90 is relatively constant due to the plenum chamber 35 and the provision of an adequate volume of air at a low pressure from the blade type fan, there is no irregularities in feeding through the nozzle area, and the seed and fertilizer are carried at a uniform rate as determined by the metering rollers.

It should also be noted that if desired the metering rollers can be supported on center bearings in each tank section. The center roller would be mounted relative to the tank walls if desired.

The tank assembly for seed and fertilizer is mounted on the center section of a folding wing field cultivator assembly, and the only portions or parts from the seeding attachment that go onto the wings (if no gauge wheels are shown) are the hoses 98 and the individual clips 103 and tubes 104 which attach to each of the furrow openers. Seeding and cultivating can be done in one trip, promoting fuel conservation and minimum tillage as practices. Low investment is required by the need to provide only the tanks, the metering mechanisms and the hoses for obtaining a large seeding apparatus.

In FIGS. 8 and 9, a type of gauge wheel that can be used with the individual spring loaded cultivator shanks that is shown. The schematic showing illustrates a typical spring shank 101 that is utilized. A "U" shaped bracket 114 is mounted in the midportion of the shank. The U shaped bracket 114 pivotally mounts an arm 115, which is pivotally mounted as at 116 to the bracket. The lower end of the arm 115 is laterally offset, as shown in FIG. 9, and carries a wheel spindle 117 that rotatably mounts a suitable wheel 118. The wheel 118 may control the depth of penetration of the shovel 102 into the ground and at the same time it will pack dirt in around the furrow that is created by the shovel. The wheel has a semi-pneumatic tire and it is of relatively wide width to insure that it spans the furrow created.

A stop screw 120 is threadably mounted into a sleeve 121 at the upper end of the arm 115, and this screw bears against the rear and upper surface of the shank 101 to provide a stop for the wheel 118 to hold it in a desired position as it moves along the top surface of the ground.

When the cultivator frames are raised (lifted out of the ground), the wheel 118 can merely drop down so arm 115 rests against the shank.

This gauge-packing wheel can be used if desired for added precision in controlling the depths of seeding and also for additional packing of dirt over the seed.

One of the features of the present device is that the opening 87 at the top of the seed cups (where fertilizer drops in) is forward facing and is visible to an operator on the tractor towing the unit. The tractor would be at the left hand side of the sheet. The fan assembly, as stated is shown only schematically, and it is in normal position located so that it does not interfere with visibility of any large number of openings 87 of the seed cups. If plugging does occur in chamber 90 the fertilizer and seed will build up and will start to spill out the openings 87 where it can immediately be seen by the operator of the tractor.

The troughs 72 can also easily be removed if the screens 72A plug up. Likewise, the individual seed cups are easily removed by using the spring clips 95 and just releasing them from the respective tanks, cleaning them out and then putting them back into place. The tubes 97 and 98 do not have to be disconnected for this cleaning operation.

In the second form of the invention shown in FIGS. 10–12, the tank for holding seed and fertilizer is modified in construction, as are the feed rollers, and also, the seed mounting for the cups is slightly modified. As in the previous form of the invention, one tank section assembly is utilized for each ten foot width of cultivator. The tanks are mounted on the center assembly of the cultivator as shown before. The air supply, plenum chamber, and discharge tubes leading to each of the individual cultivator shovels are the same as those previously disclosed. Referring to FIGS. 10, 11 and 12, a seeder tank assembly illustrated generally at 140 is supported on a frame member 141, that comprises an upright member used for supporting the frame in the usual manner, and attaches to a cultivator frame indicated at 142. The cross tube 143 forms the plenum chamber as previously indicated.

The tank assembly 144 in this instance comprises a single tank housing seed and fertilizer. The tank assembly includes an upper tank section indicated generally at 145 and a lower roller-feeder assembly or feed control unit 150.

The upper tank section has a rearward wall 146 that extends across the lateral width of the tank, and a forward wall 147. The walls 146 and 147 have upper edges that define an opening 148. A suitable rain tight cover member 148 can be placed over this opening 148 to keep the moisture from the interior of the tank. The front and rear walls 146 and 147 are connected together with end walls in the usual manner to enclose the tank. One end wall is indicated at 149.

Adjacent the lower ends of the walls 146 and 147, there are flanges 146A and 147A, respectively, that are used for attaching the lower feed control unit 150 to the upper tank section 145. The feed control unit comprises end plates 151 connected together with a rear wall 152 and a forward wall 153. The rear wall 152 has a flange 152A which mates with flange 146A and is fastened thereto with suitable bolts or screws, and the forward wall 153 has a flange 153A which mates with the flange 147A and is removably attached thereto. It should be noted that the lower feed control unit can be replaced or removed for repair without changing the upper tank section 145. Also, the lower feed control unit may be a common interchangeable unit used with a number of different upper tank assemblies.

The lower feed control unit includes means for mounting the metering rolls for feed and fertilizer in the manner previously described. As shown, the rear wall 152 has a generally vertical lower section 152B which extends downwardly and a generally horizontal flange 152C is formed at the lower end thereof. Wall 152 is attached to and mounted between the end plates 151 in a normal manner.

A vertical partition wall 155 is mounted between the end plates 151. This partition wall 155 is mounted directly below an adjustable partition wall 156 that is attached to the end walls forming the upper tank section 145. The partition wall 156 forms a partition between a seed hopper or compartment indicated generally at 157 and a fertilizer hopper or compartment indicated at 158. Wall 156 has end flanges 156A that are bolted in place to the end walls 149. There are two flanges 156A one on each end of the wall 156. The wall 156 can be tilted about its lowermost mounting screw or bolt 156B to a dotted line position as shown to change the volume of the fertilizer compartment 158 and the seed compartment 157. The position of wall 156 can be modified to suit existing conditions without altering the structure of the tank itself, so that more seed can be carried than fertilizer and the ratio between seed and fertilizer can be changed when different rates of application of one relative to the other are desired. Removing the screws from the flanges 156A and tilting the wall 156 to a desired position and then replacing the screws in the flange 156A to a new set of holes that may be provided in each of the end walls for the tank is all that is required to change the size of the compartments.

Immediately below wall 156, there is a inverted U shaped member 161 which provides a shield over the upper edge of wall 155. When the lower feed control unit 150 is in place, the wall 155 forms a continuation of the partition or divider between the seed and fertilizer compartments of the upper tank.

At the lower end of wall 155 there are a pair of converging wall sections 162 supported on the wall 155 and wall 152 that guide grain or seed from compartment 157 through an opening between the wall sections to a pair of feed rollers indicated generally at 163 which are mounted in the side plates 151,151 schematically shown in FIG. 11. The feed rollers are driven in a desired manner. These rolls can be ground driven through a chain and sprocket assembly, or can be driven with a hydraulic motor as in the first form of the invention.

The rollers 163 are covered with suitable elastomeric material and they touch at their tangent lines and when rotated the rollers meter seed from compartment 157. On the fertilizer compartment side of the wall 155, there are a pair of converging walls 164 which are spaced apart to form an opening above a pair of fertilizer metering rollers 165, which in turn are also mounted in bearings on the side plates 151,151 and which are powered to meter fertilizer out through the rolls. The rolls 165 are constructed as previously explained and have elastomeric outer portions.

In the metering of the fertilizer, the fertilizer will drop downwardly from the rolls as shown onto a relatively rigid mesh screen indicated generally at 166 which is mounted onto a wall 167 forming guide pans for the fertilizer. The wall 167 extends all the way between the side plates 151, 151 and is mounted onto a rod 168 at its upper end. It is held in the position as shown in solid lines in FIG. 10 through the use of a pair of pins 169, which can be latched into the side plates 151 and then pulled out to permit the lower end of wall 167 to swing downwardly against stop pins indicated at 170, as shown in dotted lines. The screen 166 can be cleaned of any lumps, and the wall provides a shield to prevent rain from falling into the seed cups which are positioned below the wall 167.

In this form of the invention, the individual seed cups indicated generally at 175 are constructed in the same manner as in the first form of the invention insofar as the interior construction is concerned, including a forward wall which has an incline down along which the fertilizer will slide as shown, an interior inlet orifice leading to the lower chamber in the seed cup, and the outlet nozzle which is larger than the inlet orifice. The seed cups 175 are each connected through a separate tube 176 to an outlet connection 177 on the plenum chamber 143. The tube 176 is connected to an inlet 178 that leads through the inlet orifice to the interior chamber in which the stream of fertilizer and seed (which is metered by and drops down from the rollers 163) are carried to an outlet nozzle 179 and through suitable tubes 180 to the respective furrow openers.

The upper portions of the seed cups 175 are constructed somewhat differently from the first form of the invention, and at the rear of the seed cups, suitable notches 175A are provided in the side walls 175B. The notches fit onto the flange 152C. The seed cups are thus held on this flange 152C through the interlocking function of the notch and flange. The forward ends of the seed cups 175 are held in position with a pair of tension springs 181 that attach to the respective side plates 151,151. One such spring is shown in FIG. 11. The springs 181 connect to opposite ends of a cross bar 182 that engages the inclined forward walls 175C of all of the seed cups in each lower unit. The bar 182 contacts all of the seed cups in the unit. The springs 181 keep the bar up tight against the seed cups and the side walls of the seed cups engage a suitable stop rod 183 that extends between the side plates 151.

It can be seen that the upper opening 184 of the seed cups 175 is visible from an operators platform in the same manner as in the previous form of the invention, and thus plugging would cause a visual indication by spillage from the openings 184. In this manner the operator can determine when plugging occurs.

If a seed cup 175 plugs, it can be removed from the assembly by pulling it out so notches 175A clear flange 153C. The bar 182 will move as springs 181 expand until the notch clears the flange. Then the seed cup can be tilted downwardly and out of its position without disturbing the other seed cups. This makes the device not only very secure through the use of the springs 181, but also easily removed for cleaning.

Thus, in the second form of the invention a standard lower feed control unit can be utilized with different size upper tanks if desired, and the compartments in the upper tank can be varied as to the ratio between fertilizer and seed which is stored. The roller assemblies 163 and 165 retain the seed and fertilizer in the tanks, and prevent it from escaping.

If something should happen to the rollers, if they need to be replaced, or if they have to be adjusted in any manner, the entire lower unit can be removed by taking out the bolts which connect the flanges 152A and 153A to the flanges 146A and 147A.

Further, the entire assembly of seed cups is shielded from rain and the like so there is no problem with water standing in the lower portion of the seed cups causing delays in getting started.

The feed rollers can be driven, as stated previously, by a suitable ground drive driving from one of the gauge wheels or other ground engaging wheels of the seeder unit or the field cultivator. Further, when the pan or wall 167 is swung down to its position against the stop member 170 by pulling out the pins 169, it provides a complete shield against any rain coming in through the openings 181 of the seed cups.

The fan used for air pressure is the same as in the first form of the invention. If desired, the vacuum side of the fan can be used as a source of vacuum to clean out the tanks and lower feed control unit. A barrel can be mounted on the cultivator frame as a collector plenum or tank, and one hose connected to the vacuum side of the fan. A second hose leading from the tank is used for the actual cleaning.

The semi-rigid plastic hoses 98 are forced into the respective tubes 104 sufficiently far so that the hoses 98 are frictionally gripped at the bend portions of tubes 104 and are retained without clips or the like. The seed is directed by tubes 104 into the moist earth immediately behind the respective furrow openers.

What is claimed is:

1. In a pneumatic distributor arrangement for distributing particulate materials from a storage tank and having a pair of elastomeric rollers having a length extending across the storage tank for metering discrete particles from said storage tank in a substantially continuous line extending along the length of said metering rollers, the rollers being substantially contiguous along the length thereof, the improvement comprising a plurality of individual cups positioned below said metering rollers to receive material being dispensed, said cups being individually removably attached to said storage tank and positioned therebelow, said cups having fore and aft walls and side walls joining said fore and aft walls to form an open topped cup, the fore and aft walls having lower portions, a bottom wall joining the lower portions and extending therebetween to define a chamber adjacent the bottom of each of said cups, an inlet orifice defined in one of the lower portions and an outlet opening of larger diameter than the inlet orifice substantially directly axially aligned with said inlet orifice and defined in the other lower portion, each side wall having an upper edge substantially contiguous with the upper edges of the side walls of ajdacent cups, the upper edges of the side walls of adjacent cups extending transverse to the length of said metering rollers and forming the sole means of dividing the line of dispensed material from the metering rollers into separated portions in each cup, said lower portions of the fore and aft walls being spaced a distance apart to permit the particulate material to drop into the chamber of each cup and into the flow of fluid passing from each inlet orifice to the respective outlet opening.

2. The combination as claimed in claim 1 wherein the distribution arrangement includes two tanks, one ahead of the other and each with metering roller means, and at least one of said fore and aft walls of each cup being inclined from its lower portion toward the tanks so that the open top of the seed cup is elongated in fore and aft direction.

3. The combination of claim 1 wherein said bottom wall is part cylindrical and the outlet opening has a radius substantially the same as and having its lower edge adjacent the part cylindrical bottom wall.

4. The combination of claims 1 or 2 or 3 wherein the inlet orifice is an orifice in the range of 11/32 inch in diameter and has the properties of a sharp edged orifice, and the lower portions of said fore and aft walls are spaced not more than ⅝ of an inch.

5. A pneumatic seeder attachment comprising a tank for storing particulate material to be metered and dispensed, a pair of rollers mounted relative to the tank for metering material from the bottom of the tank along substantially the entire length of the rollers, said rollers being elastomeric and substantially contiguous to each other along their lengths, a plurality of seed cups detachably mounted below said rollers and having a part cylindrical bottom wall and side walls with upper edges extending transverse to the length of the rollers, the upper edges of the side walls of adjacent cups being substantially contiguous to form the sole means for dividing material dispensed by said rollers into individual portions, and means to establish a fluid flow at the lower portions of said cups to carry the individual portions of the metered material to desired remote locations including a sharp edged orifice forming an inlet to the cup adjacent the bottom wall and an outlet opening aligned with the inlet and being of larger size than the orifice and spaced a selected distance therefrom.

6. The pneumatic seeder attachment of claim 5 wherein said tank includes at least two sections, one for storing seed and the other for storing particulate fertilizer, a separate pair of rollers mounted relative to each of the tank sections for metering material at the bottom of the respective tanks along substantially the entire length of each pair of rollers, said seed cups being positioned below both pairs of rollers and providing material dispensed from each of the pairs of rollers into individual portions in each seed cup.

7. The pneumatic seeder attachment of claim 5 wherein each of the individual seed cups includes a forward wall extending between the side walls thereof, each forward wall being recessed below the upper edges of the side walls to provide an opening facing in the direction of normal movement of the pneumatic seeder attachment during use and visible to an operator of the seeding attachment for observing the metered material.

8. A pneumatic seeder attachment for an agricultural implement having furrow opener assemblies mounted on said implement, said attachment including a storage tank, metering means for metering discrete particles from the bottom of said storage tank, a plurality of individual cup means positioned below said metering means to receive material being dispensed, said cup means each defining a chamber adjacent the bottom of each of said cup means, means to removably mount the individual cup means on said tank, said chambers including a lower part cylindrical enclosing wall and front and rear generally parallel planar upright walls, each chamber having an inlet orifice formed through the front wall having a generally horizontal axis and having the properties of a sharp edged orifice, an inlet tube connected to the front side of the front wall concentric with the inlet orifice and of larger internal diameter than the inlet orifice, and an outlet opening of larger diameter than the inlet orifice substantially directly axially aligned with said inlet orifice, the outlet opening being circular and having a lower edge substantially flush with the surface of the respective lower part cylindrical wall, a discharge tube mounted on the rear wall, said outlet opening being the end opening of the discharge tube and forming a smooth surface at the bottom of the cup from the front wall through the discharge tube, means to supply fluid under low pressure to each of said inlet orifices, said fluid flowing from the respective inlet orifice to the associated outlet opening in direction across said lower part cylindrical wall, said tank being positioned above the cup means whereby said discrete particles drop under gravity into the chambers and whereby fluid passing from each inlet orifice to the respective outlet opening intercepts particles dropping into such chamber and carries the particles through said outlet opening, said cup means having side walls having upper edges, the upper edges of adjacent side walls being substantially contiguous to form means for dividing material falling from the metering means into individual portions of material in each chamber, and conduit means extending from each outlet opening to a respective one of the individual furrow openers to carry particles to position adjacent the individual furrow openers.

9. The combination as specified in claim 8 and conduit means connected from said means to supply fluid under pressure to said inlet orifice, and wherein said chamber comprises a substantially vertical wall at the inlet side, said inlet orifice comprising an orifice of smaller diameter than the diameter of said conduit, and of smaller diameter than the outlet opening.

10. A pneumatic seeder attachment for an agricultural implement, said attachment including a storage tank having a lateral width transverse to the normal direction of movement and a continuous opening extending across the storage tank at the bottom thereof, at least one metering roll positioned in the opening of the tank for metering and dispensing material from the bottom of said tank along the entire length of the opening, individual cup means removably positioned below said metering roll to receive said material being dispensed, said cup means having side walls and being positioned side by side so the upper edges of the side walls are substantially contiguous, a chamber adjacent the bottom of each of said individual cup means, said chamber having a lower wall preventing material from falling through the chamber, an inlet leading from a source of fluid under low pressure, and an outlet aligned with said inlet whereby fluid will pass through said chamber from said inlet to said outlet, said cup means being positioned below the storage tank so that material dispensed by the metering roll will drop under gravity from the metering roll through the opening into said chambers to be carried by the fluid stream passing from said inlet to said outlet, said upper edges of said side walls of said cup means forming means dividing the material dispensed by the metering roll into individual portions into the chambers of the cup means after the material drops from the metering roll, each of the individual cup means including a forward wall between the side walls, each forward wall being recessed at the top thereof below the side wall upper edges to provide an opening facing in the direction of normal movement and visible to an operator of the seeding attachment during operation to permit observing when proper material flow of the dispensed material is occurring, and conduit means between said outlet and a remote location to fluidly convey particles dropping into said chambers to desired positions.

11. The combination as specified in claim 10 wherein said side walls of said cup means are generally perpendicular to the axis of said metering roll, said side walls of adjacent cup means being contiguous at the upper edges of the side walls, lower portions of said side walls of each cup means tapering toward each other in direction toward the respective chamber.

12. The combination as specified in claim 10 wherein said attachment comprises a frame, a tank assembly mounted onto said frame, said frame having one tubular frame member extending generally parallel to the axis of the metering roll and spanning substantially the width of said tank assembly, said tubular frame member being closed to form a plenum chamber having an inlet from a source of fluid under low pressure and a plurality of outlets, each outlet leading to a separate one of said cup means.

13. The seeder attachment of claim 10 in combination with an agricultural implement having a plurality of furrow opener assemblies, said implement having a frame, said furrow opener assemblies each comprising a spring shank attached to said frame and a furrow opener at the lower end of the shank which opens a narrow furrow into which the conduit means discharges particles, and a depth control furrow covering wheel mounted on each shank, each wheel being of width to span the furrow made by its respective furrow opener to cover particles deposited in the furrow by said conduit means.

14. The combination of claim 13 wherein said wheels are mounted onto an arm, means to pivotally mount each arm to its respective shank, and adjustable stop means operable between the shank and the arm to limit the upward pivoting of each of the wheels.

15. A pneumatic seeder attachment for an agricultural implement, said attachment including a storage tank having a lateral width transverse to the normal direction of movement and a continuous opening extending across the storage tank at the bottom thereof, at least one metering roll positioned in the opening of the tank for metering and dispensing material from the bottom of the tank along the entire length of the opening, a plurality of individual cup means removably positioned below said metering roll to receive material being dispensed under gravity, each cup means including a lower part cylindrical wall formed about an axis and forming a closed bottom wall of the chamber, first and second parallel walls spaced apart in direction of the length of the part cylindrical wall and joined to the part cylindrical wall to form a lower chamber, side walls joining the lower part cylindrical wall and the first and second walls so that the lower chamber has a width not substantially greater than the diameter of the lower part cylindrical wall, said side walls extending upwardly from the lower chamber, front and rear end walls joined to the first and second walls and to the side walls above said lower chamber to form an open topped cup into which material drops from the metering roll, said first wall being narrow and having a circular sharp edged orifice formed therein with the axis of the orifice substantially coincidental with the axis of the lower part cylindrical wall, a source of fluid under pressure coupled to the sharp edged orifice to provide a fluid stream through the orifice toward the second wall, a circular outlet opening defined in the second wall substantially coaxial with the sharp edged orifice and being of size larger than the sharp edged orifice and selected to be slightly larger than the expanded size of the fluid stream from the sharp edged orifice when it reaches the outlet opening, said part cylindrical wall being not substantially larger in diameter than the outlet opening.

16. The apparatus of claim 15 wherein the sharp edged orifice is generally 11/32 inches in diameter and the first and second walls are spaced no greater than ⅝ inches apart.

17. The combination as specified in claim 15 wherein said outlet is defined on a substantially vertical wall generally parallel to said first mentioned wall adjacent said inlet, tube means carrying fluid under pressure to said inlet, said outlet being substantially of the same diameter as the interior diameter of the tube means carrying fluid to said inlet, and said sharp edged orifice being substantially smaller than the inside diameter of the tube carrying fluid to said inlet.

18. A seeder assembly for use in combination with a cultivating implement such as a field cultivator having a plurality of shovels forming furrow openers thereon, said field cultivator having a frame comprising a center section and outer wing sections pivotally mounted to said center section, said seeder assembly further comprising a seeder attachment frame, a plurality of tanks mounted on said seeder attachment frame, said seeder attachment frame being mounted on the center section of said cultivator frame, said tanks being formed into tank sections including a fertilizer section and a seed storage section, said fertilizer section having a pair of rollers adjacent the bottom thereof for metering fertilizer through said rollers, trough means for guiding fertilizer being metered by said rollers, each tank having a pair of rollers on the bottom thereof for metering seed from the respective tank, a plurality of seed cups individually removably mounted on each tank to receive seed metered by said rollers and divide said seed into portions for each of the seed cups, said seed cups comprising side by side members mounted on each tank and each seed cup having an opening at a forward edge thereof spaced from and below the trough of the fertilizer section of the respective tank to receive fertilizer dropping from said trough and divide said fertilizer into portions for each seed cup, each of said seed cups having a chamber defined by a part cylindrical lower wall at the lower end of the chamber, said chambers each being defined by front and rear generally vertical walls joining said part cylindrical lower wall, said front wall comprising a sharp edged orifice fluid inlet and said rear wall comprising a fluid outlet, said fluid inlet and said fluid outlet each being substantially circular and coaxial, said fluid outlet being substantially co-axial with and the same radius as the part cylindrical lower wall and being substantially larger than said fluid inlet, separate first conduit means for carrying fluid from a low pressure source to each of said fluid inlets, said first conduit means having an internal diameter substantially equal to the diameter of the fluid outlet from the respective chamber, and separate second conduit means connected to each of said fluid outlets and leading to an individual one of said furrow openers, the seed and fertilizer dropping into the respective chamber of said seed cups being carried by said fluid through said outlets and second conduit means connected thereto to individual furrow openers.

19. The combination as specified in claim 18 and means to connect each of said second conduit means in position adjacent said furrow opener comprising a clip member, a tube mounted on said clip member, said tube having an outlet port having a central axis positioned so the central axis at the port projects in direction toward the furrow opener to direct fluid carried through said tube toward the ground immediately behind said furrow opener.

20. The combination as specified in claim 18 and means to drive the rollers on each of said seed storage sections and fertilizer sections of each of said tanks to control the rate of feed of material through said rollers.

* * * * *